(12) United States Patent
Hamid

(10) Patent No.: US 7,508,964 B2
(45) Date of Patent: *Mar. 24, 2009

(54) BIOMETRIC IMAGING DEVICE COMPENSATING FOR NON-BIOMETRIC PARAMETERS

(75) Inventor: Laurence Hamid, Ottawa (CA)

(73) Assignee: Activcard Ireland, Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 11/779,930

(22) Filed: Jul. 19, 2007

(65) Prior Publication Data

US 2008/0013806 A1 Jan. 17, 2008

Related U.S. Application Data

(63) Continuation of application No. 10/173,439, filed on Jun. 18, 2002, now Pat. No. 7,272,248.

(60) Provisional application No. 60/305,187, filed on Jul. 16, 2001.

(51) Int. Cl.
*G06K 9/00* (2006.01)

(52) U.S. Cl. .................. 382/125; 382/124; 340/5.53; 340/5.83; 356/71

(58) Field of Classification Search ............ 382/124, 382/125; 340/5.53, 5.83; 356/71
See application file for complete search history.

(56) References Cited

U.S. PATENT DOCUMENTS

| 5,778,089 | A  | 7/1998  | Borza ................. 220/367.1 |
| 5,978,495 | A  | 11/1999 | Thomopoulos et al. ..... 382/124 |
| 6,259,108 | B1 | 7/2001  | Antonelli ............... 250/556 |
| 6,314,195 | B1 | 11/2001 | Fukuzumi .............. 382/115 |
| 6,330,345 | B1 | 12/2001 | Russo et al. ........... 382/115 |
| 6,442,286 | B1 | 8/2002  | Kramer ................ 382/124 |
| 6,459,804 | B2 | 10/2002 | Mainguet .............. 382/124 |
| 6,747,696 | B1 | 6/2004  | Nakata et al. .......... 348/243 |

FOREIGN PATENT DOCUMENTS

EP 0 785 750 6/1999

*Primary Examiner*—John B Strege
(74) *Attorney, Agent, or Firm*—Perkins Coie LLP

(57) ABSTRACT

Provided is a biometric imaging device for imaging a biological feature, which includes a sensor for detecting an environmental parameter other than relating to surface topology of the biological feature. The detected environmental parameters like temperature and humidity levels are utilized in image reconstruction to eliminate erroneous structures caused by the environmental conditions. There is also provided a biometric imaging device, which includes a preparation device for use prior to sensing a biometric image. The preparation device is used for conditioning a parameter of the biometric information source, and/or for cleaning the biometric information source.

27 Claims, 4 Drawing Sheets

BIOMETRIC IMAGING DEVICE COMPENSATING FOR NON-BIOMETRIC PARAMETERS

CROSS REFERENCE TO RELATED APPLICATIONS

This application is a continuation of application Ser. No. 10/173,439, filed Jun. 18, 2002 now U.S. Pat. No. 7,272,248, entitled "BIOMETRIC IMAGING DEVICE COMPENSATING FOR NON-BIOMETRIC PARAMETERS" which claims the benefit from Provisional Application No. 60/305,187, filed Jul. 16, 2001.

FIELD OF THE INVENTION

This invention relates generally to biometric imaging devices and more particularly to biometric imaging devices for imaging biometric surfaces capable of compensating images according to non-biometric parameters.

BACKGROUND OF THE INVENTION

With the increasing importance of personal identification for the purpose of security in remote transactions in today's world of electronic communication, biometric identification techniques are rapidly evolving into a pervasive method for personal verification. Among the different biometrics proposed for such a purpose, such as fingerprints, hand prints, voice prints, retinal images, handwriting samples and the like, fingerprint analysis is amongst the best studied biometric techniques. Fingerprint sensing and matching is a reliable and thus widely used practice for personal identification or verification. In a common approach to fingerprint identification, a live fingerprint is scanned and electronically digitized. The digitized data generally contains information pertaining to characteristic features of the fingerprint, such as ridge endings, points of ridge bifurcation, and the core of a whorl, i.e. fingerprint minutiae. The digitized data is then compared with stored data relating to fingerprints that have been obtained previously from corresponding authorized persons, i.e. fingerprint templates. When a match is detected, within a predetermined level of security in the form of a predetermined acceptance rate, the individual is identified and a corresponding action is performed.

In general, there are two types of errors associated with fingerprint identification. The first is a false reject or Type I error, and the second is a false accept or Type II error. A type II error occurs when there is sufficient similarity between fingerprints of two individuals that one is mistaken for the other. A Type I error occurs for a variety of reasons, and refers to when an individual is not identified even though the individual is an authorized user registered with the system.

It has been suggested that the underlying cause of errors in fingerprint analysis is that the amount of data from a fingerprint is too limited for it to be used in a biometric identification system involving a large number of users. Increasing resolution of the imaging devices to capture more detailed images of fingerprint minutiae, as well as the consideration of pore patterns of biological surfaces have both been applied to reduce the error rates which occur in fingerprint identification.

The above-mentioned causes for failures in fingerprint verification are closely related to the applied imaging and analyzing techniques, and are typically responsible for Type II errors. There are, however, other sources for identification errors, which are primarily of a non-biometric nature. As part of a human body, the finger and more particularly the skin is submitted to the same physiological basic rules as any other part of the human body. The skin has elastic properties that allow a certain degree of flexibility either in extending or in a constricting fashion. For example, in cold temperature conditions, the blood circulation in the extremities like fingers is reduced to maintain the body temperature. Conversely, in warmer temperature, the blood flow is increased. Thus, the condition of the fingertip and therefore the fingerprint profile itself may vary depending on the properties of the skin and the environmental conditions. This also implies slight modifications of the fingerprint to be characterized. Furthermore, the hygienic conditions of a hand, and more particularly that of the fingertip to be imaged, are also factors for possible interference in properly imaging a fingerprint. All this causes problems in a reproducibility of a fingerprint imaging process, and in turn leads to an increase in Type I or false reject error rates.

It is highly advantageous to provide a biometric imaging device capable of compensating for non-biometric parameters, by either providing well-defined conditions for imaging a biological surface, or by sensing and correcting for conditions prevalent during the process of imaging the biological surface. It is of further advantage to reduce the Type I error rates in a given fingerprint identification process, thus enhancing the reliability of fingerprint imaging devices.

OBJECT OF THE INVENTION

It is therefore an object of the instant invention to provide a biometric imaging device incorporating a sensor for sensing external parameters potentially interfering with biometric characteristics.

It is another object of the instant invention to provide a biometric imaging device allowing to compensating for non-biometric parameters interfering with biometric characteristics.

It is further an object of the instant invention to provide a biometric imaging device comprising a preparation station for providing well-defined and reproducible conditions of the skin to be scanned.

SUMMARY OF THE INVENTION

According to an aspect of the present invention, there is provided a biometric imaging device for imaging a biological feature, the biometric imaging device comprising a first sensor for sensing the biological feature and for providing sensed image data relating to an image of a surface of the biological feature, a second sensor for detecting an environmental parameter other than relating to surface topology of said biological feature, and a processor for receiving the sensed image data and the detected environmental parameter and for correcting or restoring the sensed image data in dependence upon the detected environmental parameter.

According to an aspect of the present invention, there is further provided a method for imaging a biological feature comprising the steps of sensing the biological feature and providing sensed image data relating to an image of a surface of the biological feature, detecting an environmental parameter other than relating to surface topology of said biological feature, and correcting or restoring the sensed image data in dependence upon the detected environmental parameter.

According to another aspect of the present invention, there is provided a biometric imaging device for imaging a biological feature of a biometric information source, the biometric imaging device comprising a capacitive contact imaging device that senses the biological feature and provides sensed data relating to an image of the biological feature, and a preparation device contacting the biological surface temporarily near and/or simultaneously with a sensing of the biological surface, the preparation device adapted to condition a parameter of the biometric information source.

According to another aspect of the present invention, there is further provided a method for imaging a biological feature of a biological information source comprising the steps of manipulating an environmental parameter of the biological information source and sensing image data of the biological feature, after manipulating the environmental parameter.

According to yet another aspect of the present invention, there is provided a method for imaging a biological feature of a biological information source comprising the steps of cleaning the biological information source; and sensing image data of the biological feature, after cleaning the biological information source.

According to yet another aspect of the present invention, there is further provided a biometric imaging device comprising a swipe contact imager disposed for having a fingertip passes there across, and a cleaning station disposed adjacent the swipe contact imager for having the fingertip passed there across, portions of the fingertip contacting the cleaning station prior to passing across the swipe contact imager, wherein in use portions of the fingertip are cleaned prior to being imaged in order to provide for imaging of a clean fingertip.

BRIEF DESCRIPTION OF THE DRAWINGS

Exemplary embodiments of the instant invention will be described in conjunction with the following drawings, in which similar reference numbers designate similar items.

DETAILED DESCRIPTION OF ILLUSTRATIVE EMBODIMENTS

The method and system of the present invention are now described with reference to a capacitive contact swipe imager for sensing a biological surface. Of course, the present invention is not restricted to swipe imagers, or to capacitive contact imagers, but is optionally used with optical imagers, thermal imagers, and other types of imaging devices. Further, the invention is not restricted to imaging a fingerprint or a biological surface, but generally applies to imaging any biological feature that is susceptible to external conditions. An exemplary capacitive contact imager driver circuit is described in detail in U.S. Pat. No. 5,778,089 to Borza issued Jul. 7, 1998, incorporated herein by reference. An exemplary capacitive contact swipe imager is described in detail in U.S. application Ser. No. 09/984,354, filed Oct. 30, 2001, and incorporated herein by reference.

In the capacitive contact swipe imager, a biometric information source is passed over a sensing pad, and data is recorded during the motion of passing over. The sensing pad comprises a plurality of individual capacitive sense elements, which are typically arranged in arrays of rows and columns. Preferably, in order to generate an image for analysis, a capacitive sensing element is smaller than half the smallest feature size to be sensed. Empirical studies have shown that a square plate of about 50 µm edge length is suitable for fingerprint sensing.

The capacitive sensing elements are arranged as to form individual linear capacitive sensing arrays within a same sensing pad. Within each linear sensing array the rows are equally spaced by a given row spacing, and the columns are equally spaced by a given column spacing. Each linear capacitive sensing array has a capacitive detective area and a resolution, depending on an area and a number of rows and columns forming the linear capacitive sensing array. In practice there are about 10 rows and 200 columns of regularly spaced elements, occupying an area of approximately 0.1×2 $cm^2$, in a representative linear capacitive sensing array. The capacitive sensing element density of the linear capacitive sensing array, which is inversely proportional to the row spacing and the column spacing of the linear capacitive sensing array, determines the resolution of the linear capacitive sensing array.

Figure 1:
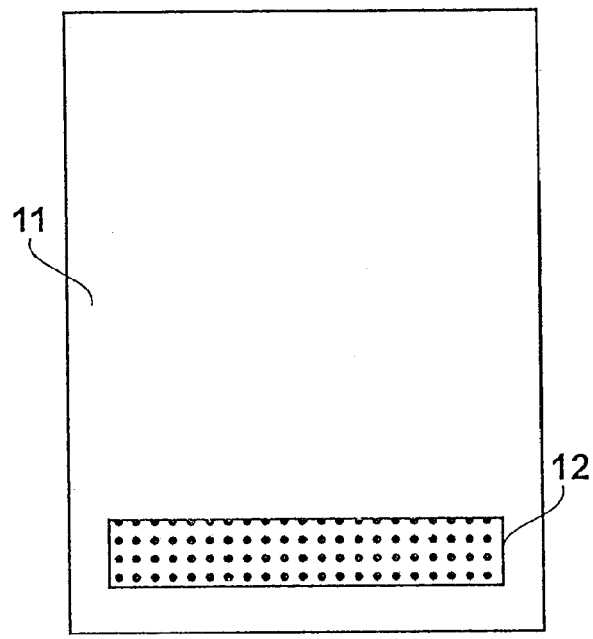
FIG. 1 is a simplified block diagram of a prior art sensing device showing a sensing pad comprising a linear capacitive sensing array.

Referring to FIG. 1, a simplified block diagram of the capacitive contact swipe imager according to prior art is shown. A sensing pad 11 comprises a linear capacitive sensing array 12. The sensing pad has an area of approximately 3×2 $cm^2$ for accepting a fingertip drawn across the sensing pad. In this example, the linear capacitive sensing array 12 comprises 10 rows and 300 columns. The linear capacitive sensing array 12 is connected through an analog switch matrix to facilitate reading of the image of a biological surface. Timing and sequencing logic (not shown) selects each element in the array, in turn, to produce a complete image of a fingerprint presented to the device.

During the swiping process, a series of partial snapshots of the fingerprint are recorded. The individual images have a sensing time difference τ, which is determined by the timing and sequencing logic. A reconstruction of a composite image representative of the biological surface scanned is based on finding overlapping areas between captured partial images; the reconstruction is achieved for example in a puzzle-like fashion. A processor (not shown) is used to correlate data corresponding to the individual partial images with each other and with previously stored sample data.

Figure 2:
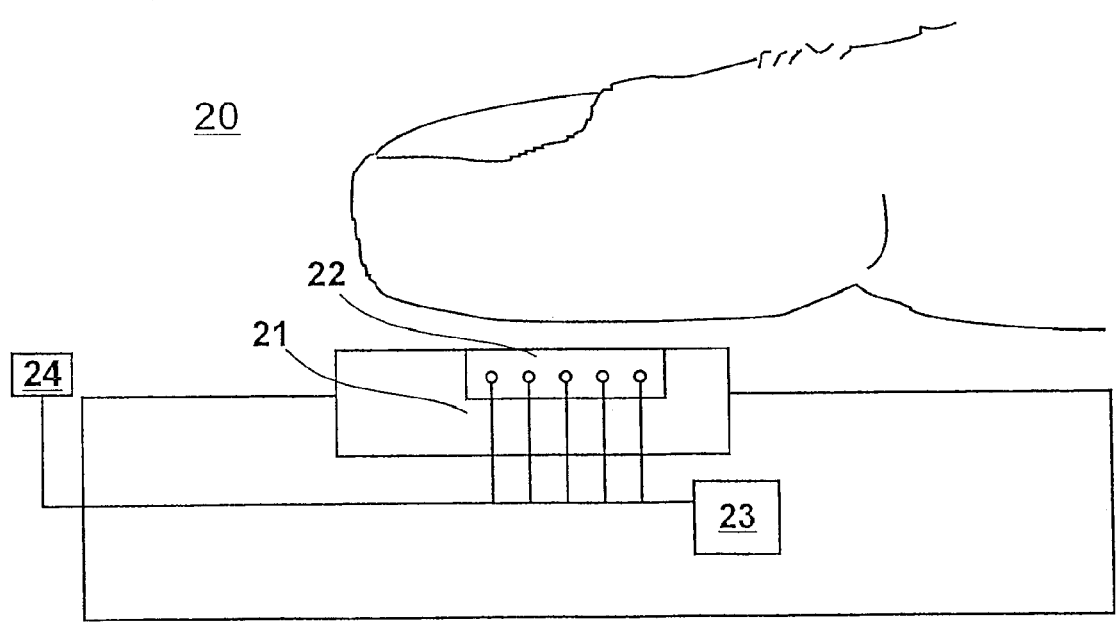
FIG. 2 is a simplified block diagram of a biometric imaging device according to a first embodiment of the present invention.

Referring to FIG. 2, a simplified diagram of a first embodiment of a biometric imaging device according to the instant invention is shown. The biometric imaging device is based on the above-described capacitive contact swipe imager. Alternatively, the present invention is based on another type of contact imager, another type of swipe imager, an optical imager, a thermal imager, or the like.

The biometric imaging device 20 includes a sensing pad 21, which comprises a linear capacitive sensing array 22. The biometric imaging device 20 further includes a processor 23, as well as a sensor 24 for sensing external conditions. The parameters sensed by the sensor include ambient temperature and ambient humidity. Both the linear capacitive sensing array 22 as well as the sensor 24 are connected to the processor 23. A biological surface, for example a fingertip, is passed over the sensing pad 21, and a plurality of partial images is captured by the linear capacitive sensing array 22, and processed by the processor 23. The processor 23 constructs a composite image from the plurality of partial images. During image construction, the data sensed by the sensor 24 are taken into account by the processor 23.

In order to perform a best possible analysis of the biological surface, the processor 23 automatically introduces those parameters sensed by the sensor 24 for taking into account the physiological conditions of the biological surface imaged during the image process. For example, when used in Canada during winter, the extreme environmental conditions decrease the elasticity of the skin and conversely increase the dryness of the skin. Therefore, when sensing for example, a fingerprint, the processor 23 transforms the image of the fingerprint accordingly, using for example a similarity transformation. This way, a processed image is obtained corresponding to predetermined or averaged environmental conditions for which the physiological characteristics of the skin are within predetermined or averaged limits.

Figure 3:
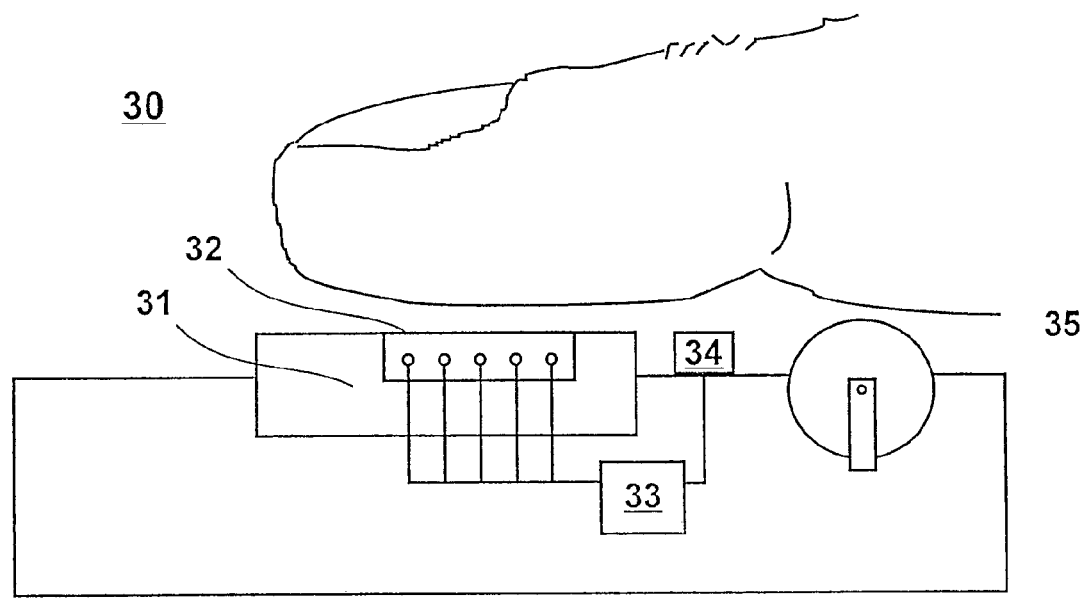
FIG. 3 is a simplified block diagram of a biometric imaging device according to a second embodiment of the present invention.

Referring to FIG. 3, a simplified diagram of a second embodiment of a biometric imaging device according to the instant invention is shown. The biometric imaging device 30 again includes a sensing pad 31, which comprises a linear capacitive sensing array 32, a processor 33, as well as a sensor 34. The sensor 34 is for sensing the conditions of the biological surface to be imaged. The biometric imaging device 30 further includes a roller 35 for guiding a biological surface to be imaged, for example a fingerprint, towards the linear capacitive sensing array 32. The sensor 34 is disposed between the sensing pad 31 and the roller 35. This way, it is most likely that the data sensed by the sensor 34 corresponds to the condition of the biological surface sensed by the linear capacitive sensing array 32. Both the linear capacitive sensing arrays 32 as well as the sensor 34 are connected to the processor. When in use, a biological surface to be imaged, such as a fingertip, is positioned on the roller 35 and pushed forward towards the sensing pad 31. While moving forward, the fingertip passes over the sensor 34, where physiological parameters such as dryness and/or temperature are read. The sensor 34, which is connected to the processor 33, communicates the physiological information. In the example of using the biometric imaging device 30 in Canadian winter conditions, a temperature of the fingertip is lower than an average body temperature of 37° C., and a high degree of dryness is measured for the skin of the fingertip. The processor 33 receives the sensed information and includes the parameters for analyzing the fingerprint image. The analysis of the image data takes into account that because the skin is affected by the environmental conditions, the pattern of the fingerprint features is thereby affected. Therefore, the processor 33 transforms the image of the fingerprint accordingly to obtain a processed image corresponding to predetermined or averaged environmental conditions. Of course, the compensations induced by the processor 33 are different in warmer conditions because they depend upon the reading of the sensor 34. Other parameters sensed by the sensor 34 are for example a humidity level of the biological surfaced to be imaged. A high content of adherent moisture affects the relative height and depth of ridge and valley structures of fingerprint profiles. Thus, it is the detail of the ridge and valley structures that is lost in certain areas due to the collection of excessive moisture in the valleys. Appropriate data processing algorithms used during image reconstruction are possibly applied in order to restore undisturbed detail information.

Figure 4:
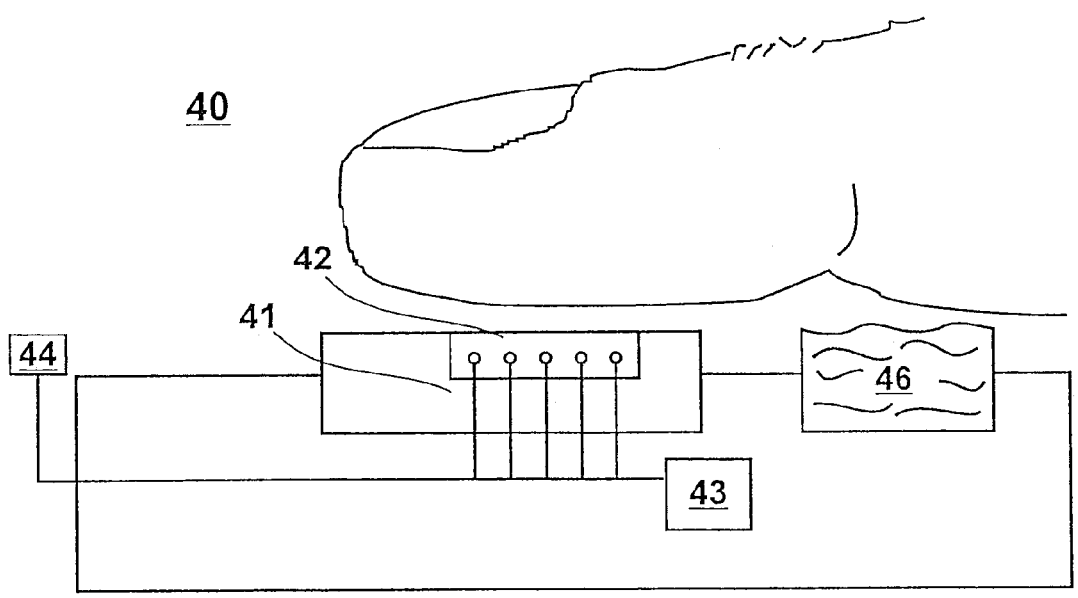
FIG. 4 is a simplified block diagram of a biometric imaging device according to a third embodiment of the present invention.

Referring to FIG. 4, a simplified diagram of a third embodiment of a biometric imaging device according to the instant invention is shown. As described above for the first and second embodiment, the biometric imaging device 40 includes a sensing pad 41, comprising a linear capacitive sensing array 42, a processor 43 and a sensor 44. In the third embodiment, a cleaning station 46 is added to the biometric imaging device 40. Optionally, a roller is also added to the biometric imaging device 40. The cleaning station allows for cleaning the fingertip prior to imaging the fingerprint. It thus allows for removing as much dust or any impurity as possible for improving the quality of the image. A cleaning process in the form of, for example, a hand lotion dispenser, an air jet dispenser, a wire brush, a series of sponges for wetting and drying the fingertip alternately in order to remove dirt known to cause imaging problems, or any other convenient cleaning process is used. Advantageously, the cleaning station is disposed in a position for cleaning the fingertip before the fingerprint is imaged.

Figure 5:
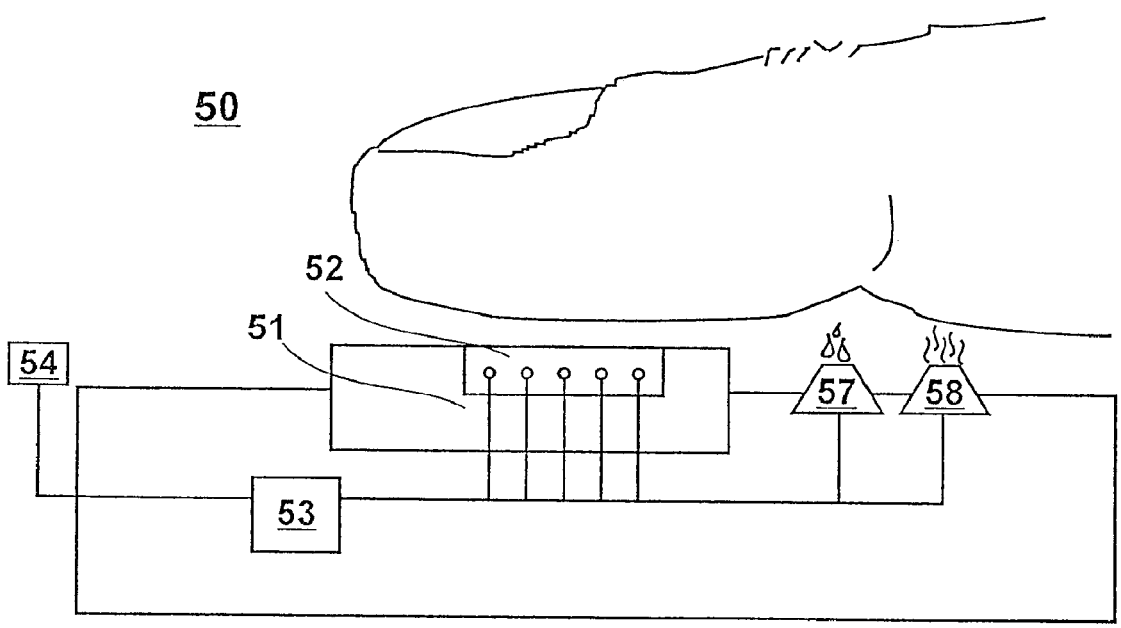
FIG. 5 is a simplified block diagram of a biometric imaging device according to a fourth embodiment of the present invention.

Referring to FIG. 5, a simplified diagram of a fourth embodiment of a biometric imaging device according to the present invention is shown. The biometric imaging device 50 includes a sensing pad 51, comprising a linear capacitive sensing array 52, a processor 53 and a sensor 54. The sensor detects the ambient temperature and the ambient moisture level for the biometric imaging device. Alternatively, the sensor 54 is installed in a way, so that the sensor 54 detects the physiological conditions of a biological surface to be imaged, such as a fingertip, the physiological conditions being for example the temperature and the dryness of the fingertip. Optionally, a roller is added to the biometric imaging device 50. Further optionally, a cleaning station is added to the biometric imaging device 50. The sensor 54 as well as the linear capacitive sensing array 52 are connected to the processor 53. Further, two compensating devices 57 and 58 are added to the biometric imaging device. The compensating devices are possibly provided in the form of a moisturizer 57 for compensating for dryness and of thermal unit 58 for applying heat. Alternatively, only one or more than two compensating devices are added to the biometric imaging device 50. If for example the biological surface to be imaged is a fingertip which dryness and/or temperature are lower than an average body temperature and dryness, the compensating devices adjust the conditions of the fingertip to comply with pre-defined standard conditions. Further, the compensating devices 57 and 58 are connected to the processor 53. Therefore, according to the sensed information received from the sensor 54, the processor 53 automatically compensates for non-biometric parameters by increasing the fingertip temperature via the thermal unit 58, if the sensor 54 detects a temperature too low for allowing a non-distorted image of the fingerprint.

Alternatively, the sensors 44 and 54 are omitted from the above embodiments of the biometric imaging devices 40 and 50, wherein only cleaning or other preparation of the fingertip is performed prior to imaging thereof.

Figure 6:
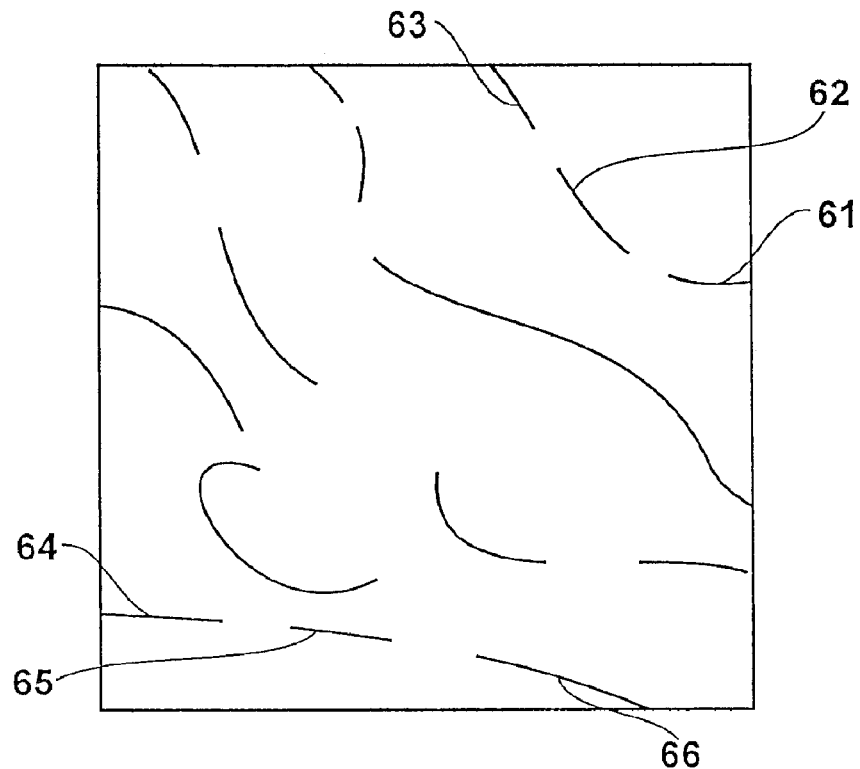
FIG. 6 is an image of a fingertip sensed under dry conditions.
Figure 7:
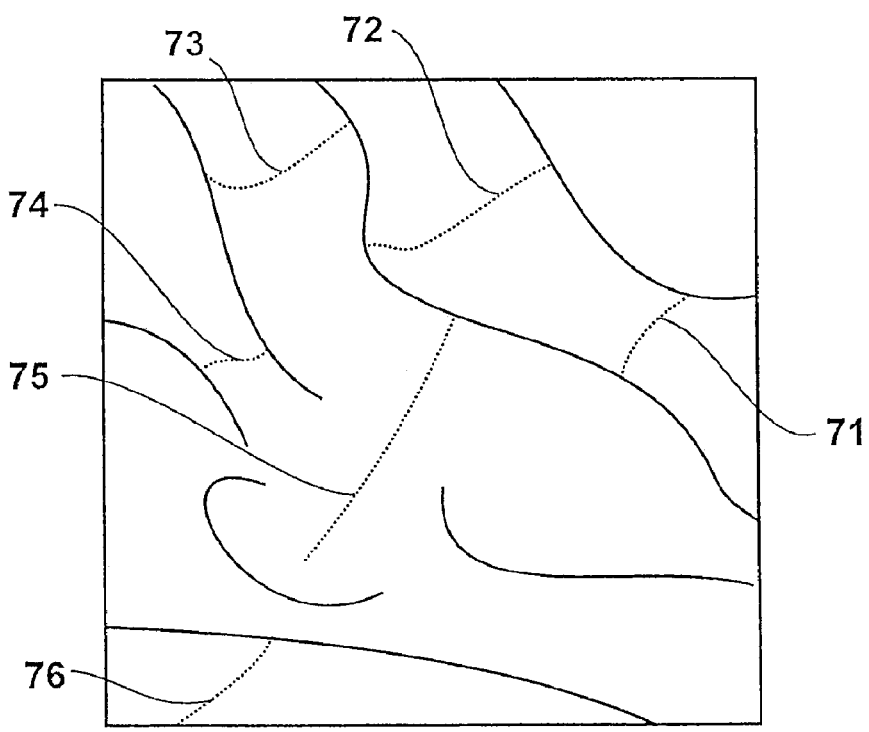
FIG. 7 is an image of a fingertip sensed under moist conditions.

Referring to FIGS. 6 and 7, two exemplary images of a fingertip are shown, sensed according to dry and moist conditions of the fingertip. An image of the fingertip sensed under dry conditions, FIG. 6, exhibits ridge and valley structures, which are broken up into separate segments. For example, the structural elements 61, 62, 63 and 64, 65, 66 most likely belong to one continuous feature each. When the environmental conditions are known when the image is reconstructed, appropriate interpolation routines are applied as to eliminate possible image distortions due to dry environmental conditions. Similarly, an image of the fingertip sensed under moist conditions, FIG. 7, exhibits additional features connecting ridge structures, which blur the image of a fingertip. For example, the structural elements 71, 72, 73, 74, 75 and 76 are most likely artifacts stemming from adhesive moisture to the fingertip. When the humidity and moisture levels are known when the image is reconstructed, appropriate data processing routines are employed to correct for erroneous structural features. Also, when the fingertip is conditioned prior to sensing using the preparation device, it is likely that far less image distortions are recorded when the fingertip is sensed.

The above examples refer to fingerprint imaging using a capacitive contact swipe imager, but the systems and methods described are equally applicable to other contact based biometric imaging including palm scanning and skin imaging in general. Furthermore, the system and method of the present invention are easily extended to any kind of image analysis of a biological feature, which is susceptible to external conditions.

Although the present invention has been described with respect to specific embodiments thereof, various changes and modifications are optionally carried out by those skilled in the art without departing from the scope of the invention. Therefore, it is intended that the present invention encompass such changes and modifications as fall within the scope of the appended claims.

What is claimed:

1. A biometric imaging device for imaging a biological feature, the biometric imaging device comprising:
    means for sensing the biological feature and for providing sensed image data relating to an image of a surface of the biological feature;
    means for detecting an effect of a sensed environmental parameter on the biological feature, wherein the sensed environmental parameter is other than a parameter relating to surface topology of the biological feature; and
    processing means for correcting or restoring the sensed image data in dependence upon the detected environmental parameter.

2. The biometric imaging device of claim 1 wherein the sensing means comprises at least one of a capacitive contact imaging device, an optical imaging device, and a thermal imaging device.

3. The biometric imaging device of claim 2 wherein:
    the sensing means comprises a capacitive contact swipe imager that senses data in the form of a plurality of partial images; and
    the processing means constructs a composite image from the plurality of partial images.

4. The biometric imaging device of claim 1 wherein:
    the detecting means comprises a temperature sensor that senses a temperature of the biological surface; and
    the processing means implements data processing algorithms to eliminate artifacts resulting from the sensed temperature.

5. The biometric imaging device of claim 1 wherein:
    the detecting means comprises a temperature sensor that senses an environmental temperature; and
    the processing means implements data processing algorithms to eliminate artifacts resulting from the sensed temperature.

6. The biometric imaging device of claim 1 wherein:
    the detecting means comprises a humidity sensor that senses a humidity of the biological surface; and
    the processing means implements data processing algorithms to eliminate artifacts caused by the sensed humidity.

7. The biometric imaging device of claim 1 wherein:
    the detecting means comprises a humidity sensor that senses an environmental humidity; and
    the processing means implements data processing algorithms to eliminate artifacts caused by the sensed humidity.

8. The biometric imaging device of claim 1 wherein the biological feature is a fingertip.

9. The biometric imaging device of claim 4 wherein the artifacts are discontinuities in ridges.

10. The biometric imaging device of claim 4 wherein the artifacts relate to image distortion.

11. The biometric imaging device of claim 5 wherein the artifacts are discontinuities in ridges.

12. The biometric imaging device of claim 5 wherein the artifacts relate to image distortion.

13. The biometric imaging device of claim 6 wherein the artifacts are discontinuities in ridges.

14. The biometric imaging device of claim 6 wherein the artifacts are connections between adjacent ridges.

15. The biometric imaging device of claim 7 wherein the artifacts are discontinuities in ridges.

16. The biometric imaging device of claim 7 wherein the artifacts are connections between adjacent ridges.

17. A biometric imaging device for imaging a biological feature, the biometric imaging device comprising:
    means for sensing the biological feature and for providing sensed image data relating to an image of the biological feature;
    preparation means positioned upstream from the sensing means for adjusting an environmental parameter of the biological feature just prior to or simultaneously with a sensing of the biological feature by said sensing means;
    means for detecting an effect of the environmental parameter on the biological feature after adjustment by the preparation means, wherein the sensed environmental parameter is other than a parameter relating to a surface topology of said biological feature; and
    processing means for correcting or restoring the sensed image data in dependence upon the detected environmental parameter.

18. The biometric imaging device of claim 17 wherein the preparation means comprises a cleaning station that cleans the biological feature prior to imaging.

19. The biometric imaging device of claim 18 wherein the cleaning station comprises at least one of a hand lotion dispenser, an air jet dispenser, a wire brush, and a series of wet and dry sponges.

20. The biometric imaging device of claim 17 wherein the preparation means comprises means for adjusting a temperature of the biological information source prior to imaging.

21. The biometric imaging device of claim 17, wherein the preparation means comprises means for adjusting a moisture content of the biological information source prior to imaging.

22. A biometric imaging device for imaging a biological feature, the biometric imaging device comprising:
    means for sensing the biological feature and for providing sensed image data relating to an image of the biological feature;
    preparation means positioned upstream from the sensing means for adjusting an environmental parameter of the biological feature just prior to or simultaneously with a sensing of the biological feature by said sensing means; and
    means for detecting an effect of the environmental parameter on the biological feature for provision to the preparation means for use by the preparation means in adjusting said environmental parameter of the biological feature, wherein the environmental parameter is other than a parameter relating to a surface topology of said biological feature.

23. A biometric imaging device for imaging a biological feature, the biometric imaging device comprising:
   means for manipulating an environmental parameter of the biological feature;
   means for sensing image data of the biological feature downstream from said manipulating means;
   means for detecting an effect of the environmental parameter on the biological feature after manipulation by said manipulating means, wherein the environmental parameter is other than a parameter relating to a surface topology of said biological feature; and
   means for correcting or restoring the sensed image data in dependence upon the detected environmental parameter.

24. The biometric imaging device of claim 23 wherein the sensed image data is used to determine a type of manipulation by said manipulating means.

25. The biometric imaging device of claim 23 wherein the sensed image data is used to determine an amount of manipulation by said manipulating means.

26. The biometric imaging device of claim 23 wherein the manipulating means includes means for cleaning said biological feature.

27. A biometric imaging device comprising:
   imaging means for sensing a fingertip passed there-across for providing sensed image data;
   cleaning means disposed adjacent to the imaging means for cleaning the fingertip as it passes there-across and portions of the fingertip contacting the cleaning means just prior to or simultaneously with passing across the imaging means, wherein in use, portions of the fingertip are cleaned prior to being imaged in order to provide for imaging of a clean fingertip;
   means for detecting an effect of an environmental parameter on the fingertip after cleaning by said cleaning means, wherein the environmental parameter is other than a parameter relating to a surface topology of said biological feature; and
   means for correcting or restoring the sensed image data in dependence upon the detected environmental parameter.

* * * * *